(12) United States Patent
Swift et al.

(10) Patent No.: US 8,352,392 B2
(45) Date of Patent: Jan. 8, 2013

(54) METHODS AND SYSTEM FOR MODELING NETWORK TRAFFIC

(75) Inventors: Douglas K. Swift, Puyallup, WA (US); Cihan H. Dagli, Wildwood, MO (US)

(73) Assignees: The Boeing Company, Chicago, IL (US); The Curators of the University of Missouri, Columbia, MO (US)

( * ) Notice: Subject to any disclaimer, the term of this patent is extended or adjusted under 35 U.S.C. 154(b) by 860 days.

(21) Appl. No.: 11/946,371

(22) Filed: Nov. 28, 2007

(65) Prior Publication Data

US 2009/0138420 A1    May 28, 2009

(51) Int. Cl.
  *G06E 1/00*      (2006.01)
  *G06E 3/00*      (2006.01)
  *G06F 15/18*     (2006.01)
  *G06G 7/00*      (2006.01)

(52) U.S. Cl. .......................................................... 706/21
(58) Field of Classification Search .................. 706/21
  See application file for complete search history.

(56) References Cited

U.S. PATENT DOCUMENTS

| | | | | |
|---|---|---|---|---|
| 6,125,105 | A * | 9/2000 | Edwards et al. | 370/230 |
| 6,272,110 | B1 * | 8/2001 | Tunnicliffe et al. | 370/232 |
| 6,411,946 | B1 * | 6/2002 | Chaudhuri | 706/21 |
| 6,947,915 | B2 * | 9/2005 | Liang et al. | 706/25 |
| 7,113,780 | B2 * | 9/2006 | McKenna et al. | 455/431 |
| 7,443,803 | B2 * | 10/2008 | Su et al. | 370/252 |
| 2008/0240029 | A1 * | 10/2008 | Lynch et al. | 370/329 |

OTHER PUBLICATIONS

Fahlman et al.; "The Cascade-Correlation Learning Architecture"; Aug. 1991; Carnegie Mellon University; CMU-CS-90-100; pp. 0-13.*
Feng et al.; "Study on Network Traffic Prediction Techniques"; 2005; IEEE; pp. 995-998.*
Khotanzad et al.; "Multi-Scale High-Speed Network Traffic Prediction Using Combination of Neural Networks"; 2003; IEEE, pp. 1071-1075.*
Ilkka Norros, "On the Use of Fractional Brownian Motion in the Theory of Connectionless Networks," *IEEE Journal on Selected Areas in Communications*, vol. 13, No. 6, pp. 953-962 (Aug. 1995).
Will LeLand, Maurad Taqqu, Walter Willinger, and Daniel Wilson, "On the Self-Similar Nature of Ethernet Traffic (Extended Version)"*IEEE/ACM Transactions on Networking*, vol. 2, No. 1 (Feb. 1994).
Stefano Bregni, "The Modified Allan Variance as Time-Domain Analysis Tool for Estimating the Hurst Parameter of Long-Range Dependent Traffic" *IEEE Communications Society, Globecom 2004* (Dec. 2004).

(Continued)

*Primary Examiner* — Jeffrey A Gaffin
*Assistant Examiner* — Stanley K Hill
(74) *Attorney, Agent, or Firm* — Alston & Bird LLP

(57) ABSTRACT

A method and system are provided for modeling network traffic in which an artificial neural network architecture is utilized in order to intelligently and adaptively model the capacity of a network. Initially, the network traffic is decomposed into a plurality of categories, such as individual users, application usage or common usage groups. Inputs to the artificial neural network are then defined such that a respective combination of inputs permits prediction of bandwidth capacity needs for that input condition. Outputs of the artificial neural network are representative of the network traffic associated with the respective inputs. For example, a plurality of bandwidth profiles associated with respective categories may be defined. An artificial neural network may then be constructed and trained with those bandwidth profiles and then utilized to relate predict future bandwidth needs for the network.

22 Claims, 15 Drawing Sheets

OTHER PUBLICATIONS

Leopoldo Angrisani, Salvatore D'Antonio, Marcello Esposito, and Michele Vadursi, Techniques for Available Bandwidth Measurement in IP Networks: A Performance Comparison, *Journal of Computer Network*, vol. 50, pp. 332-349 (2006).

William Cleveland and Don Sun, "Internet Traffic Data," *Journal of the American Statistical Association*, vol. 95, pp. 979-985 (2000).

Houjin Li, Changchen Huang, Michael Devetsikiotis, and Gerald Damm, "Effective Bandwidths Under Dynamic Weighted Round Robin Scheduling", *Proceedings of IEEE Communications Society, Globecom 2004* (Dec. 2004).

Lie Qian, Anand Krishnamurthy, Yuke Want, Yiyan Tank, Philippe Dauchy, and Alberto Conte, "A New Traffic Model and Statistical Admission Control Algorithm for Providing QoS Guarantees to On-Line Traffic", *Proceedings of IEEE Communications Society, Globecom 2004* (Dec. 2004).

J. Ross Quinlin, "C4.5: Programs for Machine Learning", Morgan Kaufmann Publishers, Inc., pp. 5-8 (1992).

\* cited by examiner

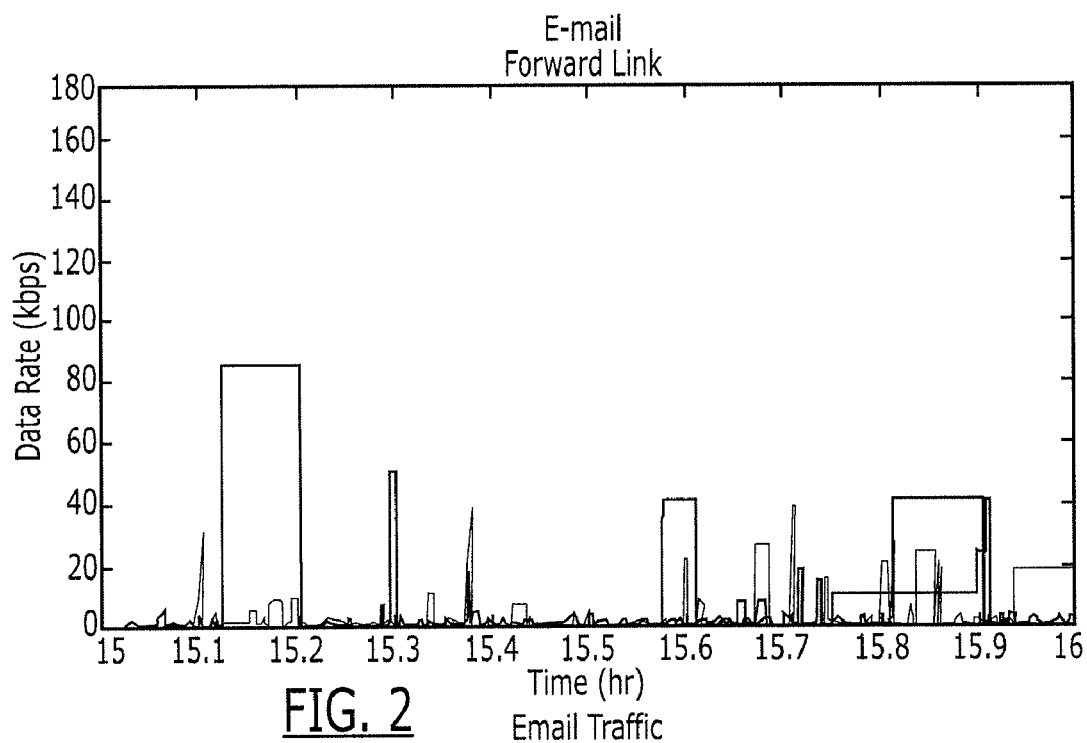
FIG. 2  Email Traffic
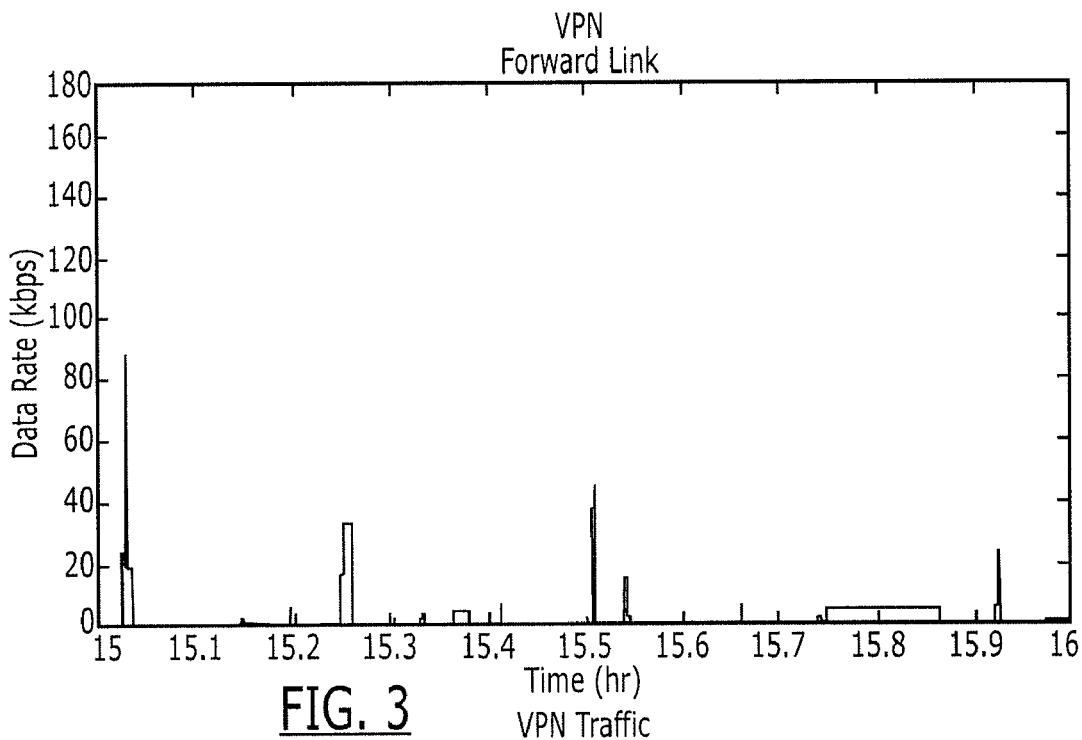
FIG. 3  VPN Traffic

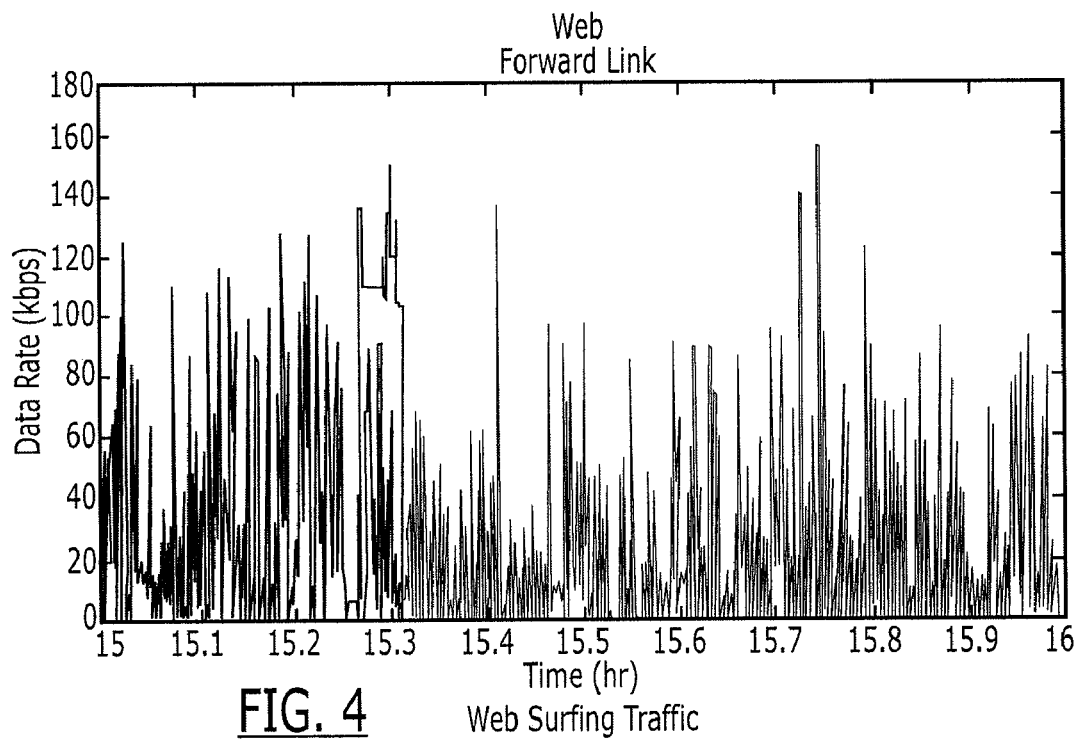
FIG. 4  Web Surfing Traffic
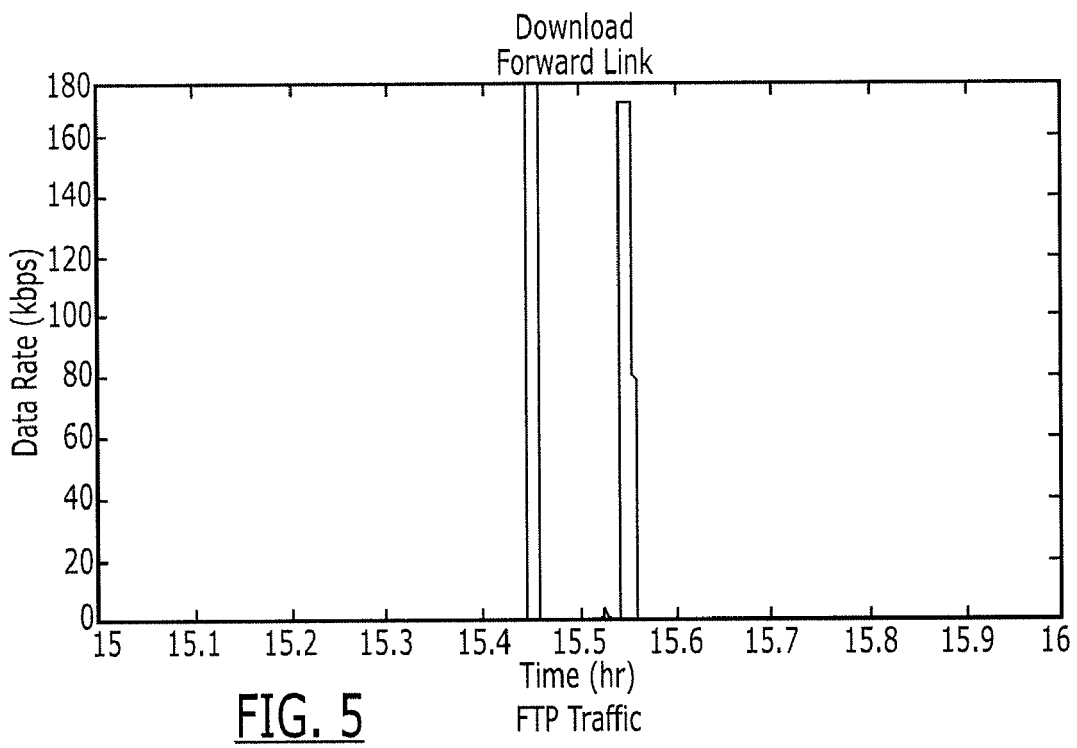
FIG. 5  FTP Traffic

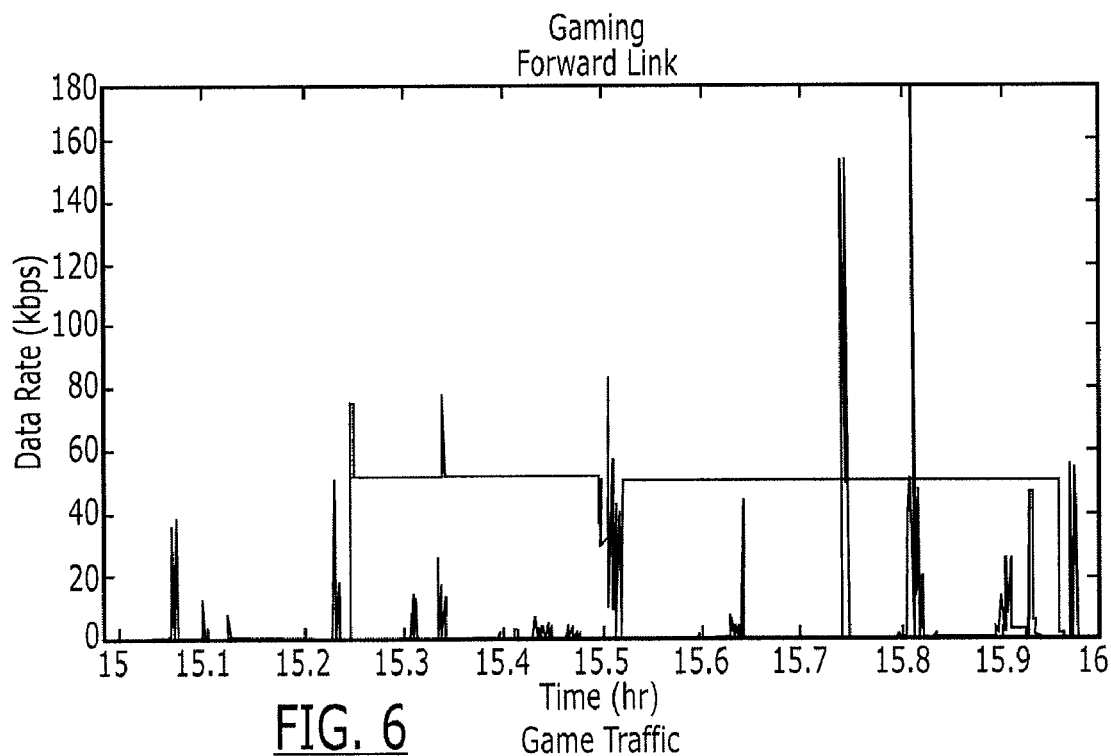
FIG. 6  Game Traffic
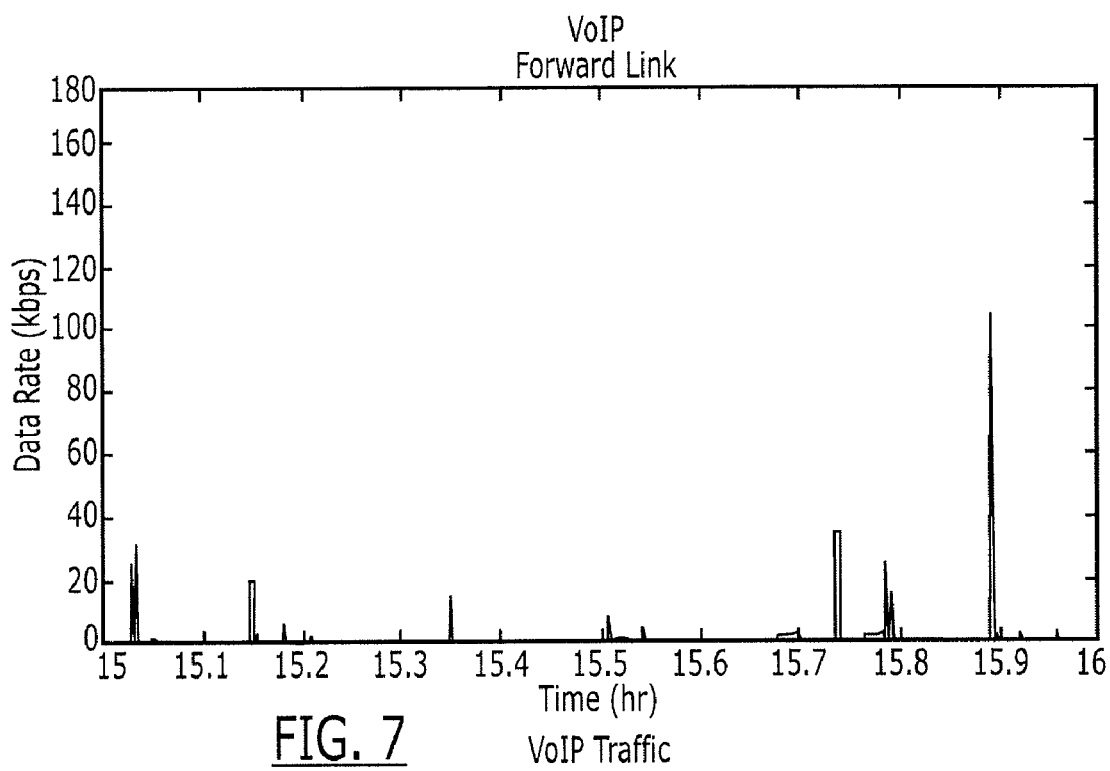
FIG. 7  VoIP Traffic

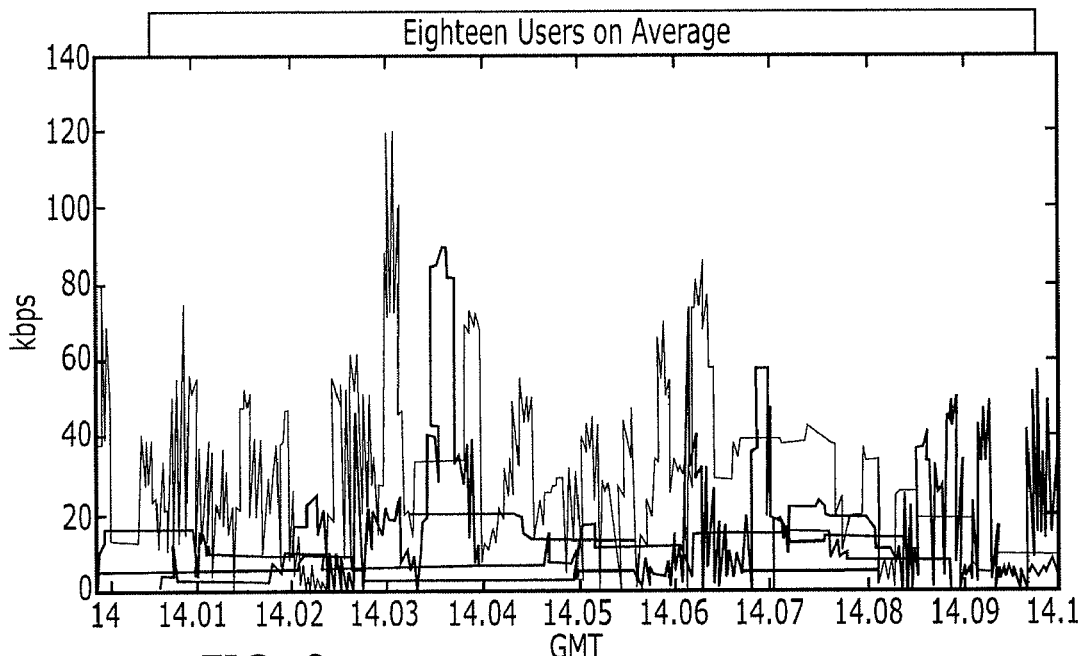
FIG. 8  Individual Users - 6 Minutes
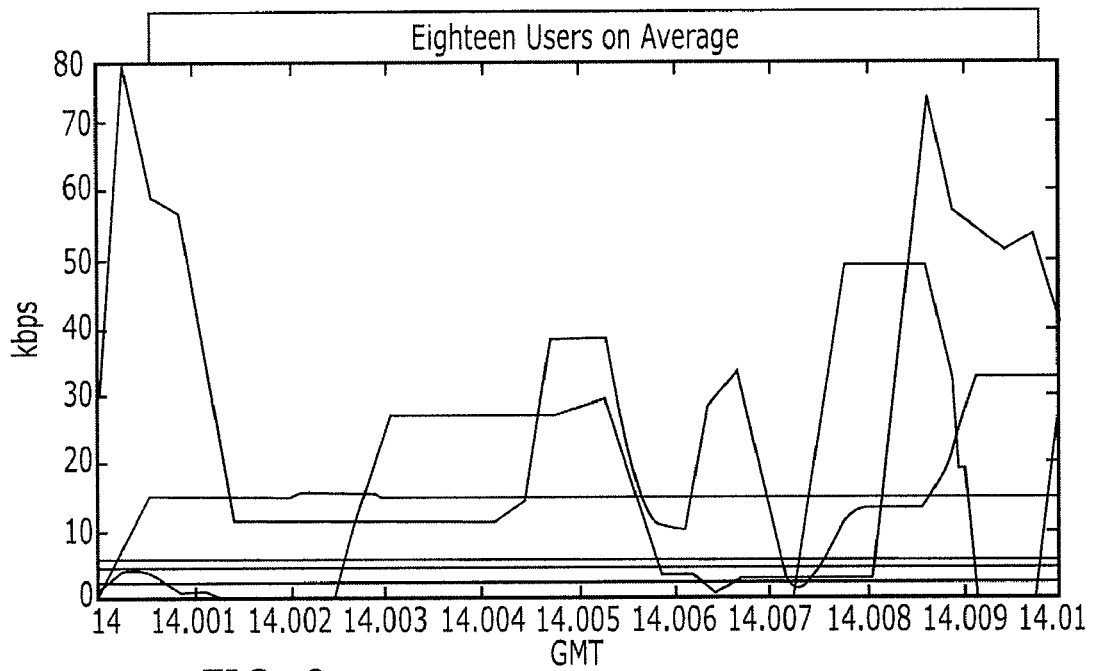
FIG. 9  Individual Users - 0.01 Hours

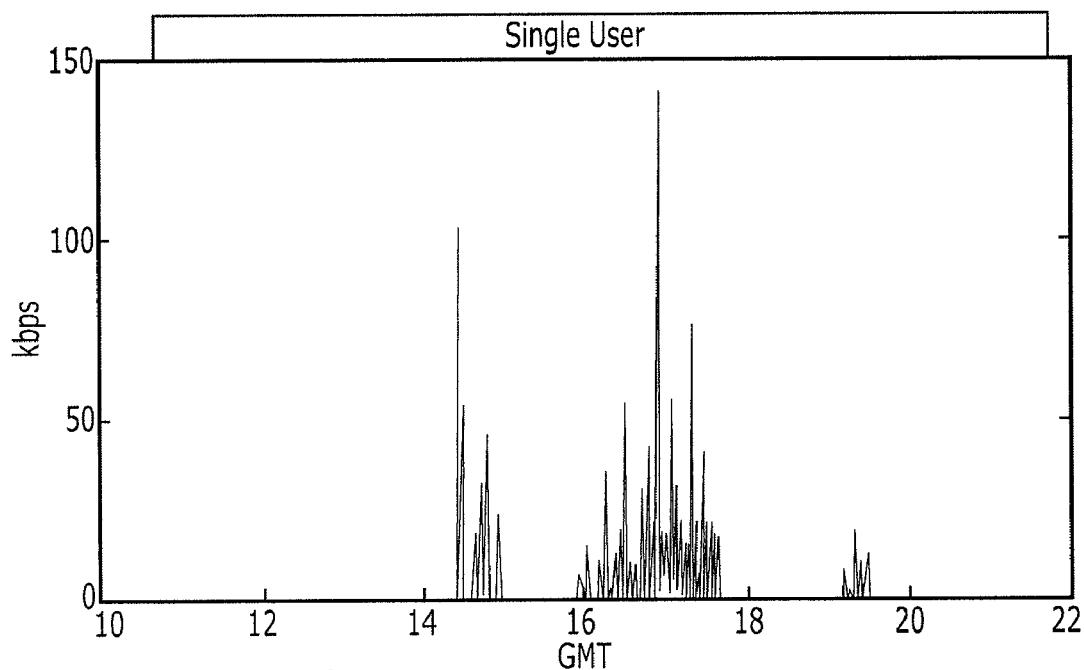
FIG. 10  Single User - 12 Hours
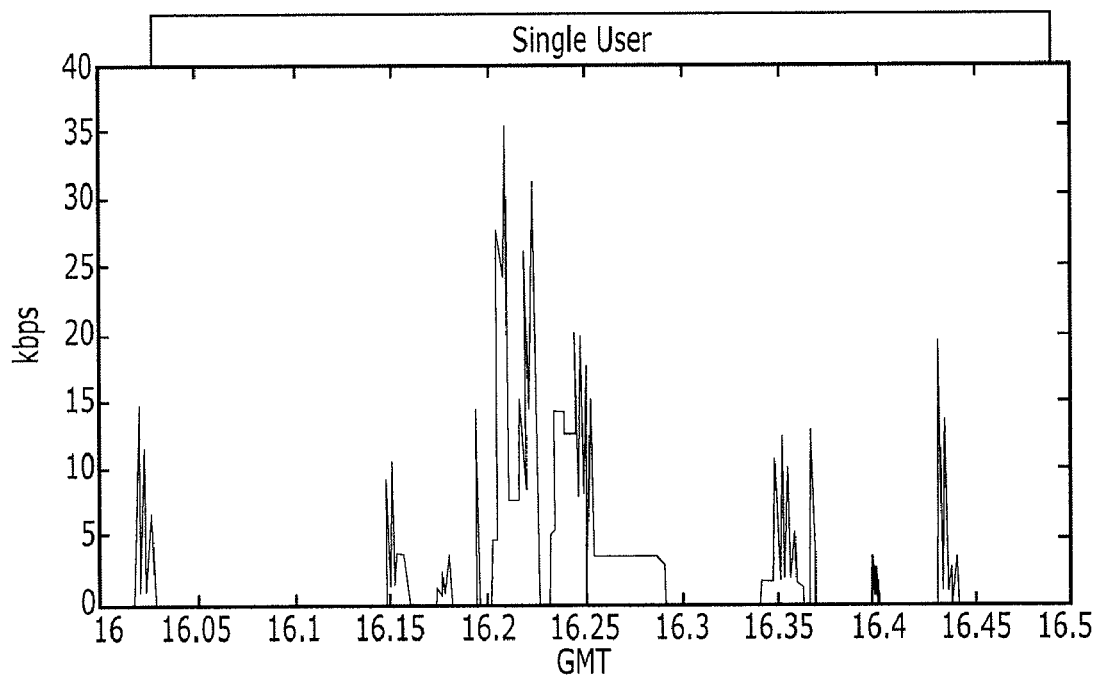
FIG. 11  Single User - 30 Minutes

METHODS AND SYSTEM FOR MODELING NETWORK TRAFFIC

FIELD OF THE INVENTION

Embodiments of the present invention relate generally to methods and systems for modeling network traffic and, more particularly, to method and systems for modeling network traffic utilizing artificial neural networks.

BACKGROUND OF THE INVENTION

It is oftentimes desirable to determine the necessary capacity of a network, such as a communications network. For example, it is sometimes desirable to predict the desired capacity of a network, both currently and at times in the future, so that the network can be properly sized and designed. In this regard, it is useful for a network to have sufficient capacity to support all of the communications that are desired to be routed over the network, while maintaining a desired quality of service for the network traffic.

While a variety of different network topologies are in use and additional network topologies will be developed, one exemplary network is a network-centric system that provides bi-directional, high-speed broadband Internet data services for commercial airline passengers through shared broadband satellites in geosynchronous orbit. One example of such a system is depicted in FIG. 1 which illustrates an aircraft 10 in flight that is configured to communicate via the network. As shown, passengers onboard the aircraft can receive television and other media broadcast from a direct broadcast satellite (DBS) television service provider 12 via a DBS satellite 14. Additionally, passengers onboard the aircraft can communicate via the Internet, corporate Intranet, military secure nets and other network via a bi-directional data link supported by a network of satellites 16, such as a network of geosynchronous Ku-band satellites. As shown in FIG. 1, for example, the satellites can communicate both with the aircraft via a downlink and an uplink and with a ground station 18 in order to upload data from the ground station to the satellite and to download data from the satellite to the ground station. The ground station, in turn, can communicate, such as via a dedicated terrestrial circuit, with a network operations center 20 which, in turn, facilitates communication with any of a variety of other networks including, for example, the Internet. Among other functions, the network operations center provides network control to monitor service usage and to increase or decrease capacity in order to maintain a desired quality of service as user demand fluctuates.

In order to model network capacity, a measure of the network traffic must be obtained. For a network that is operational, network traffic can be collected by network sniffers, i.e., passive data monitoring units, that monitor, collect and analyze traffic header information as the network traffic passes along the network. With respect to the exemplary network depicted in FIG. 1, network sniffers may be positioned at various geographical locations to monitor network traffic in route to or from the ground stations 18. While the network sniffers can collect a variety of information representative of the network traffic, the network sniffers may collect real-time packet and bit rate information for both the forward and return links established between the ground station and the constellation of satellites 16.

Based upon the data representative of the network traffic that is collected by the network sniffers or otherwise, the network capacity can be modeled. A variety of modeling techniques have been developed including models which employ stochastic-based mathematical equations for aggregating network traffic and models based on quality of service admission controls. In addition to these methods, most current modeling techniques are designed to express network traffic as a function of fractional Brownian motion as proposed, for example, by Ilkka Norros in an article entitled "On the Use of Fractional Brownian Motion in the Theory of Connectionless Networks" published in the *IEEE Journal on Selected Areas in Communications*, Volume 13, No. 6, pages 953-62 (August 1995). The modeling of network traffic as a function of fractional Brownian motion is based upon two key assumptions, namely, self-similarity and long-range dependency. In this regard, the self-similarity characteristics of network traffic were reported by Will Leland, Maurad Taqqu, Walter Willinger, and Daniel Wilson. in an article (hereinafter the "Leland article") entitled "On the Self-Similar Nature of Ethernet Traffic (Extended Version)" published in the *IEEE/ACM Transactions on Networking*, Volume 2, No. 1 (February 1994). Prior to the discovery of the self-similarity characteristics of network traffic, network traffic had been generally modeled as a Poisson process with the analysis based on the Poisson or Markov modulated distributions. However, network traffic tended to exhibit self-similarity which implies consistency over varying timesets. As described by Stefano Bregni in an article entitled "The Modified Allan Variance as Time-Domain Analysis Tool for Estimating the Hurst Parameter of Long-Range Dependent Traffic" in the proceedings of *IEEE Communications Society, Globecom* 2004 (December 2004), a self-similar random process is characterized by a dilated portion of a sample path having the same statistical characterization as the whole. In this regard, the dilation may be applied on one or both of the amplitude and time axes of the sample path. In this regard, bursty Internet traffic composed mostly of web surfing tends to be self-similar since network traffic that is burstier also tends to be closer to pure Brownian motion. By modeling network traffic as a function of fractal Brownian motion, the capacity of a network was generally determined in an algorithmic manner as a mathematical equation. In this regard, system bandwidth needs are generally approximated by the network link capacity. The network link capacity is, in turn, defined as the maximum rate for data transfer via the respective link. At a given instance in time, a link is either transmitting at capacity or is idle. The capacity of the network path consisting of N links, $L_1 \ldots L_N$, is therefore defined as:

$$A(t, \Delta t) \min_{i=1 \ldots N} \frac{1}{\Delta t} \int_t^{t+\Delta t} C_i(1 - u_i(\tau)) d\tau \qquad (1)$$

where $C_1 \ldots C_n$, are link capacities and the values $u_1(t) \ldots u_n(t)$ are percentages of link utilization, as described by Leopoldo Angrisani, Salvatore D'Antonio, Marcello Esposito, and Michele Vadursi in an article entitled "Techniques for Available Bandwidth Measurement in IP Networks: A Performance Comparison" in the *Journal of Computer Network*, Volume 50, pages 332-49 (2006).

Based on assumptions of self-similarity and fractional Brownian motion, a mathematical expression for a capacity of a network can be determined. In this regard, one mathematical expression for capacity in bits per second (BPS) is as follows:

$$C = m + (\kappa(H)\sqrt{-2\ln(\epsilon)})^{1/H} a^{1/(2H)} B^{-(1-H)/H} m^{1/(2H)} \qquad (2)$$

$$\kappa(H) = H^H (1-H)^{(1-H)} \qquad (3)$$

wherein m=Mean Bit Rate (bps) per user
a=Peakiness (bps)
$\epsilon$=Cell Loss Rate
B=Buffer Size (bits)
H=Hurst Parameter
C=Capacity (bps)

The peakiness a, or variance coefficient, is closely related to the variance of the network traffic and is a measure of the magnitude of fluctuations within the network traffic. The cell loss rate $\epsilon$ is a constant sized for the system to be modeled. The buffer size B is derived from the peak capacity of the system and the maximum queuing delay. The Hurst parameter H is a measure of the rate of decay of correlations of arriving packets or bits over time. It is further noted that the mean bit rate m, the peakiness and the Hurst parameter H collectively comprise a measure of the self-similarity of the network traffic in the aggregate.

Although traditional approaches to modeling the capacity of a network have proven useful, conventional modeling techniques are challenged when complex, large-scale global networks are to be modeled. In this regard, the mathematical expression of the capacity, as exemplified by equation 2 above, may not be applicable throughout different locations of the network. Additionally, accuracy in the modeling of the capacity is dependent upon the exact characterization of the traffic stream, which is typically not very accurate. See William Cleveland, and Don Sun, "Internet Traffic Data", *Journal of the American Statistical Association*, Volume 95, pages 979-85 (2000); Houjin Li, Changchen Huang, Michael Devetsikiotis, and Gerald Damm, "Effective Bandwidths Under Dynamic Weighted Round Robin Scheduling", *Proceedings of IEEE Communications Society, Globecom* 2004 (December 2004); and Lie Qian, Anand Krishnamurthy, Yuke Want, Yiyan Tank, Philippe Dauchy, and Alberto Conte, "A New Traffic Model and Statistical Admission Control Algorithm for Providing QoS Guarantees to On-Line Traffic", *Proceedings of IEEE Communications Society, Globecom* 2004 (December 2004).

Additionally, collecting, evaluating and constantly updating measured data from the network for input to the mathematical expression, such as for derivation of the various parameters utilized by the mathematical expression of capacity, may prove to be a tremendous challenge. In this regard, some data values may be quite difficult to extrapolate from the network traffic, especially the parameters relating to self-similarity and long-range dependency parameters such as the Hurst parameter and other self-similar characterizations. See Stefano Bregni, "The Modified Allan Variance as Time-Domain Analysis Tool for Estimating the Hurst Parameter of Long-Range Dependant Traffic", *Proceedings of IEEE Communications Society, Globecom* 2004 (December 2004). Further, the network traffic may be in a state of constant change and evolution, thereby limiting the usefulness of the mathematically derived capacity of the network. Finally, the mathematical expressions utilized to model network traffic are based upon an assumption that the network traffic is self-similar which, in turn, limits the applicability of such modeling techniques.

The difficulties associated with efforts to characterize the basic nature of modern Internet traffic and the difficulties of accurately modeling a complex global network is exemplified by the variability of data characteristics exhibited by users of different applications. In this regard, an example of the data rate over time by email applications is depicted in FIG. 2, an example of the data rate over time of virtual private network (VPN) traffic is depicted in FIG. 3, an example of the data rate over time of web surfing traffic is depicted in FIG. 4, an example of the data rate over time of file transfer protocol (FTP) traffic is illustrated in FIG. 5, an example of the data rate over time of game applications is illustrated in FIG. 6 and an example of the data rate over time of Voice over Internet protocol (VoIP) traffic is illustrated in FIG. 7. The data rates vary greatly between the various applications.

Even among individual users, there is a great degree of variability. In this regard, FIG. 8 depicts a 0.1 hour (i.e., 6 minute) time segment of the network traffic for 18 users. Additionally, FIG. 9 depicts a 0.01 hour (i.e., 36 second) time segment to illustrate the difference between individual users on a more granular level. In FIGS. 8 and 9, each line represents the data rate demanded by a respective user over time.

On an even more individualized level, a single user can have different network demands at different points in time. In this regard, FIG. 10 illustrates the network usage of a single user over a 12-hour period, while FIG. 11 depicts the network usage of a single user over a 0.5 hour segment to provide additional details. As shown in FIGS. 10 and 11, the network usage includes dead time of inactivity of varying lengths, times of high and low burstiness and times of sustained relatively constant data rates. These changing characteristics are due to varying activities of the user, such as times of high or low activity, or times when the user is utilizing different applications, such as email applications, web surfing applications or streaming media applications. As such, not only are the demands of each user upon a network different, but the network usage characteristics of a single user vary over time. As will be appreciated, the variations in the network traffic characteristics based on circumstance, time and location and the constant evolution and change of those network traffic characteristics makes it very difficult, if not impossible, to model the network capacity with explicit mathematical expressions as has been utilized in the past since the prior models have generally provided point solutions that were not particularly adaptable or scalable. As such, it would be desirable to develop an approved technique for modeling network capacity, even in instances in which the network traffic characteristics change over time and may be different based on circumstance, time and location.

BRIEF SUMMARY OF THE INVENTION

A method and system are therefore provided for modeling and predicting network traffic. A system and method are provided for utilizing artificial neural network architecture in order to intelligently and adaptively model and predict the needed capacity of a network, thereby potentially providing a more accurate assessment of the network capacity, at least in instances in which the network traffic characteristics evolve and change over time and are different based on circumstance, time and location, such as in a complex and global network.

In one aspect of the present invention, a method for modeling and predicting network traffic is provided in which the network traffic is decomposed into a plurality of categories. For example, the network traffic may be decomposed into categories consisting of individual users, application usage or common usage groups. These categories are used to train the model through learning algorithms. The method for modeling network traffic of this aspect of the present invention also defines a plurality of inputs with the inputs being such that a respective combination of inputs allows the model to determine a plurality of outputs that are representative of the predicted capacity needed for the input cases. In addition, if the input is varied from expected values, the method of modeling network traffic will adapt the output correspondingly. The method of modeling network traffic of this aspect of the present invention constructs an artificial neural network based on the categories of network traffic such that the artificial neural network is configured to evaluate the plurality of inputs and develop a plurality of outputs that represent a prediction of bandwidth capacity for the related inputs. The plurality of outputs generated by the artificial neural network therefore provides a model of the network traffic.

In order to construct the artificial neural network, the artificial neural network may be trained with a plurality of pre-defined inputs and pre-defined outputs. In this regard, the artificial neural network may be trained by comparing the plurality of outputs from the artificial neural network with a plurality of anticipated pre-defined outputs based upon the plurality of pre-defined inputs. The artificial neural network may then adapt to compensate for differences between the plurality of outputs and the plurality of anticipated pre-defined outputs. For example, the artificial neural network may include a plurality of intermediate nodes having associated transfer functions and a plurality of connections having associated weights interconnecting the inputs, outputs and intermediate nodes. In this embodiment, the adaptation of the artificial neural network may include the alteration of the weights associated with the respective connections. Further, the adaptation of the artificial neural network may include changing a number of intermediate nodes disposed between the inputs and the outputs, such as by increasing or decreasing the number of intermediate nodes. Further, the adaptation of the artificial neural network may include changing the number of layers of nodes, such as by increasing or decreasing the number of layers of nodes.

In accordance with another aspect of the present invention, a method for modeling network traffic is provided in which an artificial neural network is provided that evaluates a plurality of inputs to determine a plurality of outputs representative of the predicted network capacity needed for those cases. For example, the plurality of outputs may be bandwidth profiles associated with respective categories of network traffic. In accordance with the method of this aspect of the present invention, a plurality of attributes representative of the network traffic condition may be provided to the inputs of the artificial neural network. The plurality of attributes may then be processed with the artificial neural network in order to generate the plurality of outputs representative of the predicted network capacity. Based upon the plurality of outputs, a model of the network traffic may be generated. Further, the anticipated network capacity may be defined to at least equal an aggregate of the plurality of outputs.

The method of this aspect of the present invention may also decompose the network traffic into a plurality of categories, such as individual users, application usage and common usage groups prior to or as part of providing the artificial neural network. As noted above, the provision of the artificial neural network may include training the artificial neural network with a plurality of pre-defined inputs and pre-defined outputs. In order to train the artificial neural network, the plurality of outputs from the artificial neural network may be compared with a plurality of anticipated pre-determined outputs based upon the plurality of pre-defined inputs. The artificial neural network may then be adapted to compensate for differences between the plurality of outputs and the plurality of anticipated pre-defined outputs. In instances in which the artificial neural network concludes the need to adapt, a plurality of intermediate nodes having associated transfer functions and a plurality of connections having associated weights interconnecting the inputs, outputs and intermediate nodes, the adaptation of the artificial neural network may include the alteration of the weights associated with respective connections and/or a change in the number of intermediate nodes disposed between the inputs and the outputs.

In accordance with another aspect of the present invention, a system for modeling network traffic is provided which includes a memory device configured to store a representation of an artificial neural network which relates to a plurality of inputs to a plurality of outputs. In this regard, each output is representative of the predicted network capacity needed for the case of inputs. For example, the plurality of outputs may include bandwidth profiles represented by points on a time history associated with the condition represented by the inputs. While various categories may be employed, the categories may be based upon individual users, application usage or common usage groups. This system of this aspect of the present invention also includes a processor configured to receive a plurality of attributes representative of the network traffic as inputs to the artificial neural network. A processor is also configured to process the plurality of attributes with the artificial neural network in order to generate the plurality of outputs. Further, the processor is configured to generate a model of the network traffic based upon the plurality of outputs. Moreover, the processor of one embodiment may be configured to define an anticipated network capacity to at least equal an aggregate of the plurality of outputs.

The processor of one embodiment is further configured to train the artificial neural network with a plurality of pre-defined inputs and pre-defined outputs. In this regard, the processor may train the artificial neural network by comparing the plurality of outputs from the artificial neural network with a plurality of anticipated pre-defined outputs based upon the plurality of pre-defined inputs. The processor may then be configured to adapt the artificial neural network to compensate for differences between the plurality of outputs and the plurality of anticipated pre-defined outputs. In embodiments in which the artificial neural network includes a plurality of intermediate nodes having associated transfer functions and a plurality of connections having associated weights interconnecting the input, output and intermediate nodes, the processor may be configured to adapt the artificial neural network by altering the weights associated with respective connections and/or by changing the number of intermediate nodes disposed between the inputs and the outputs.

By employing an artificial neural network, the method and system of embodiments of the present invention permit the network traffic to be intelligently and adaptively modeled. As such, the system and method of embodiments of the present invention can provide meaningful estimations of the anticipated capacity of the network such that the network may be designed to provide the desired capacity while maintaining the requisite quality of service.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIGS. 2-7 are graphical representations of the data rate over time exhibited by users of email applications, VPN applications, web surfing applications, FTP applications, game applications and VoIP applications, respectively;

FIGS. 8 and 9 are graphical representations of the data rate over time demanded by an average of 18 users over a 0.1 hour time segment and a 0.01 hour time segment, respectively;

FIGS. 10 and 11 are graphical representations of the data rate over time demanded by a single user during a period of 12 hours and a period of 0.5 hour, respectively;

DETAILED DESCRIPTION OF THE INVENTION

The present inventions now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 12:
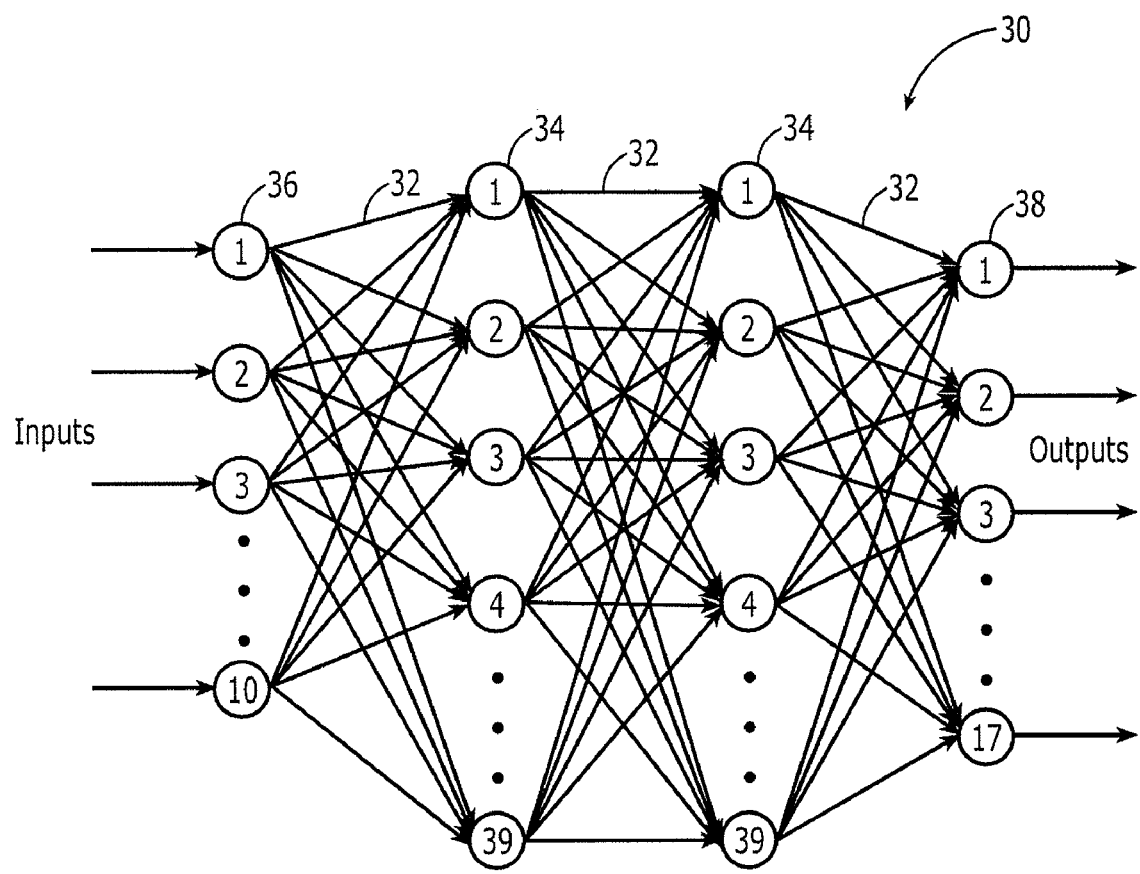
FIG. 12 is an artificial neural network constructed and/or employed in conjunction with embodiments of the present invention.
Figure 13A:
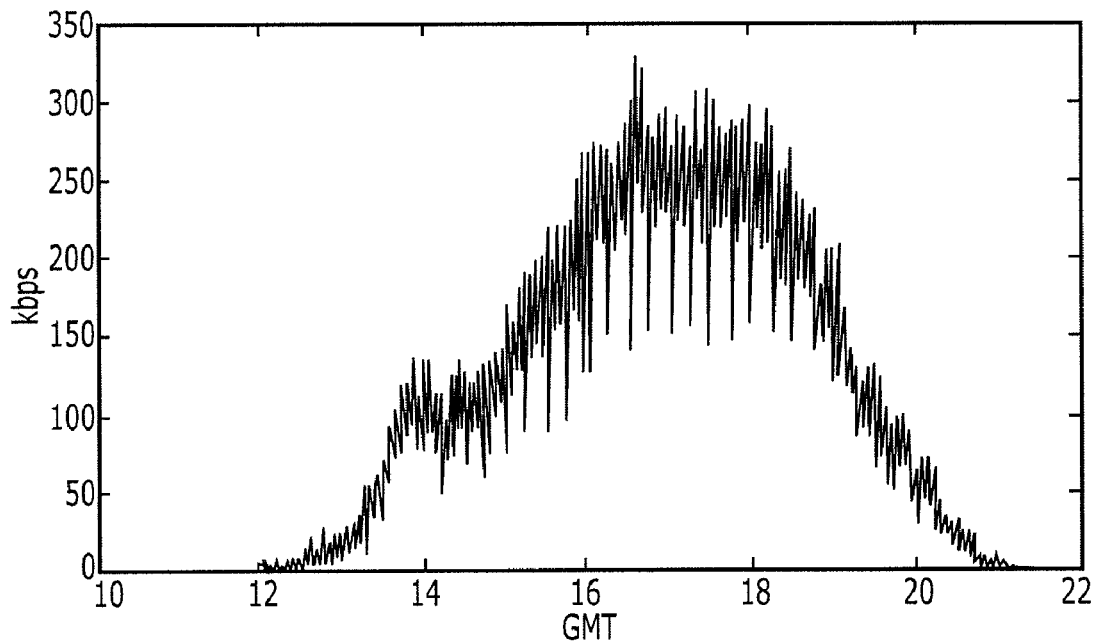
FIG. 13A-13F are bandwidth profiles for six different flight routes illustrating the aggregate data rate demanded over time for the respective flight route.
Figure 13B:
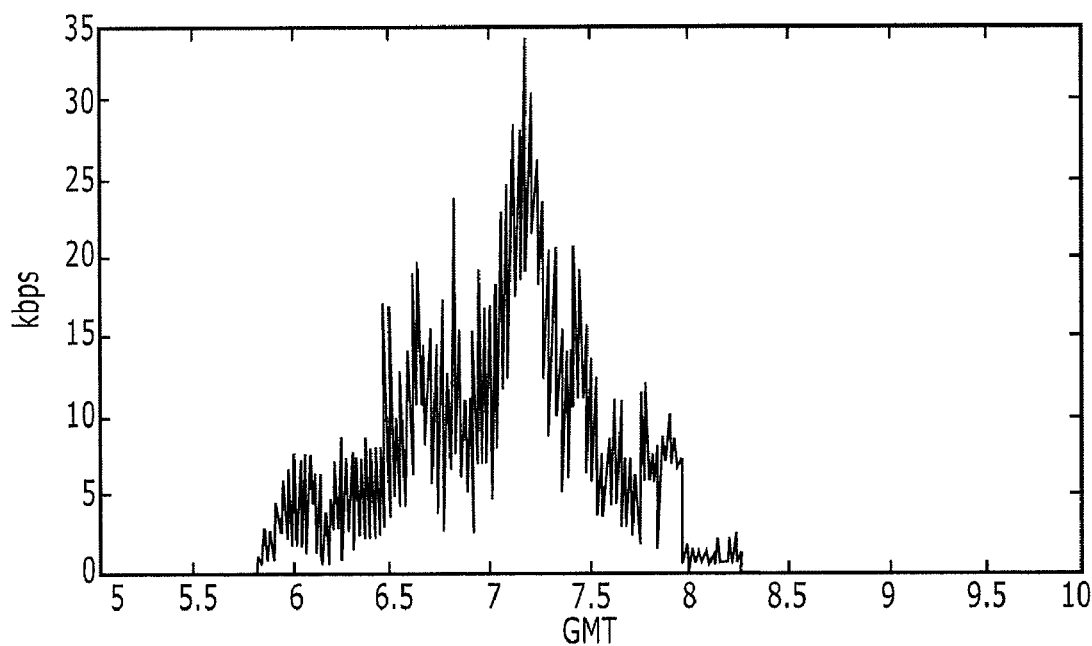
Figure 13C:
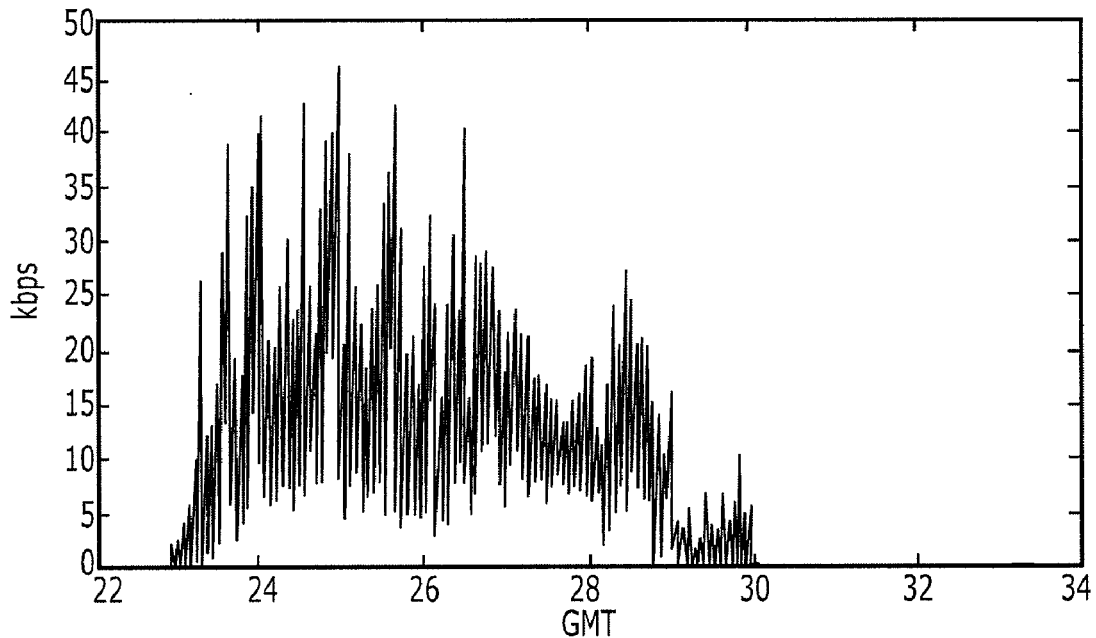
Figure 13D:
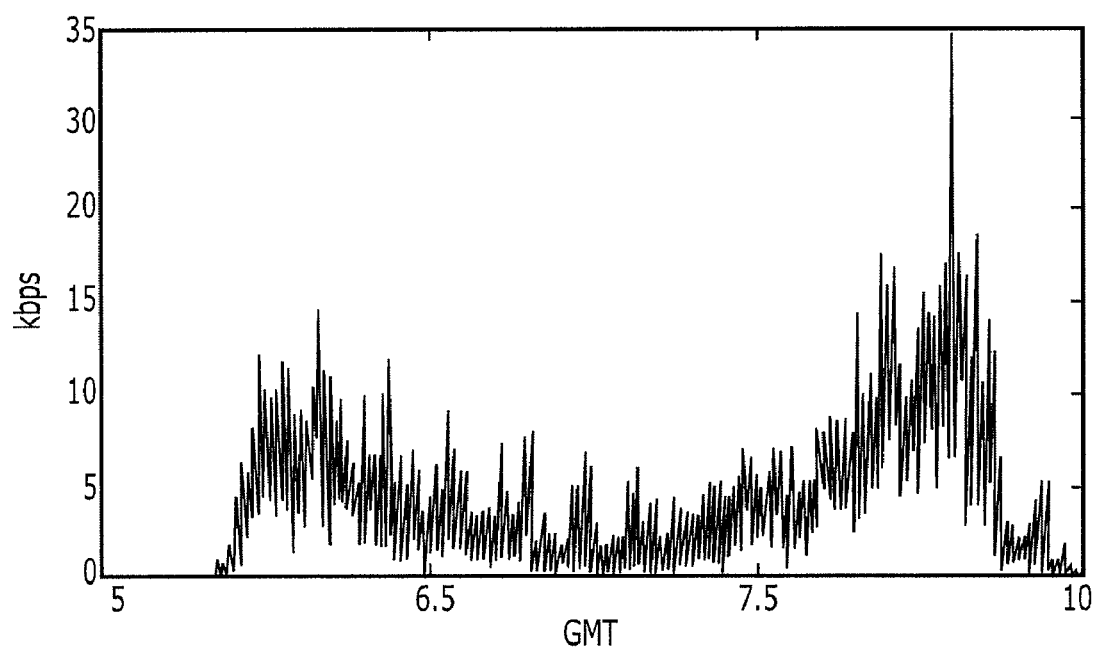
Figure 13E:
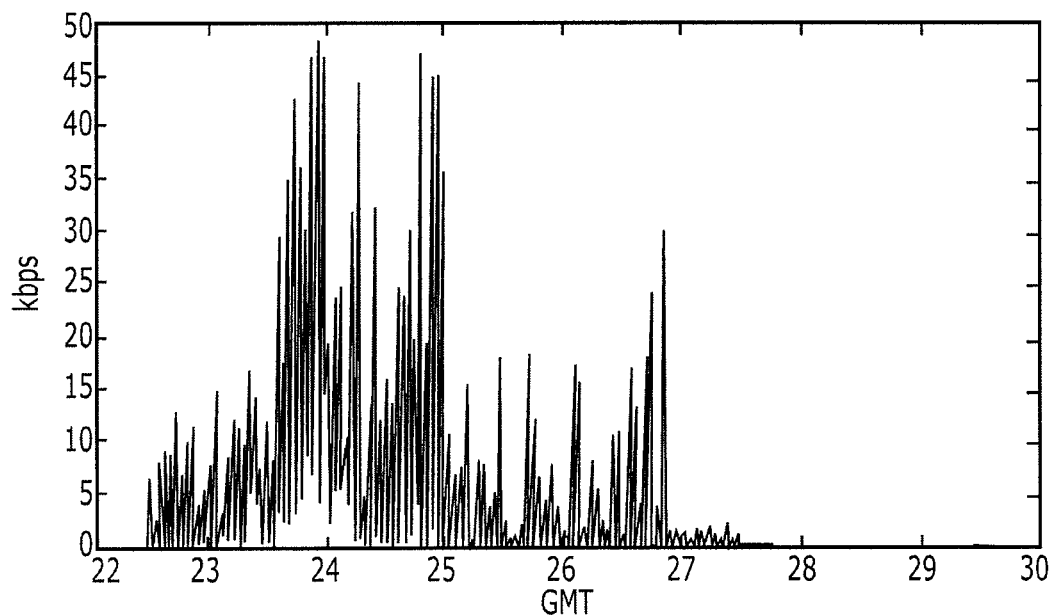
Figure 13F:
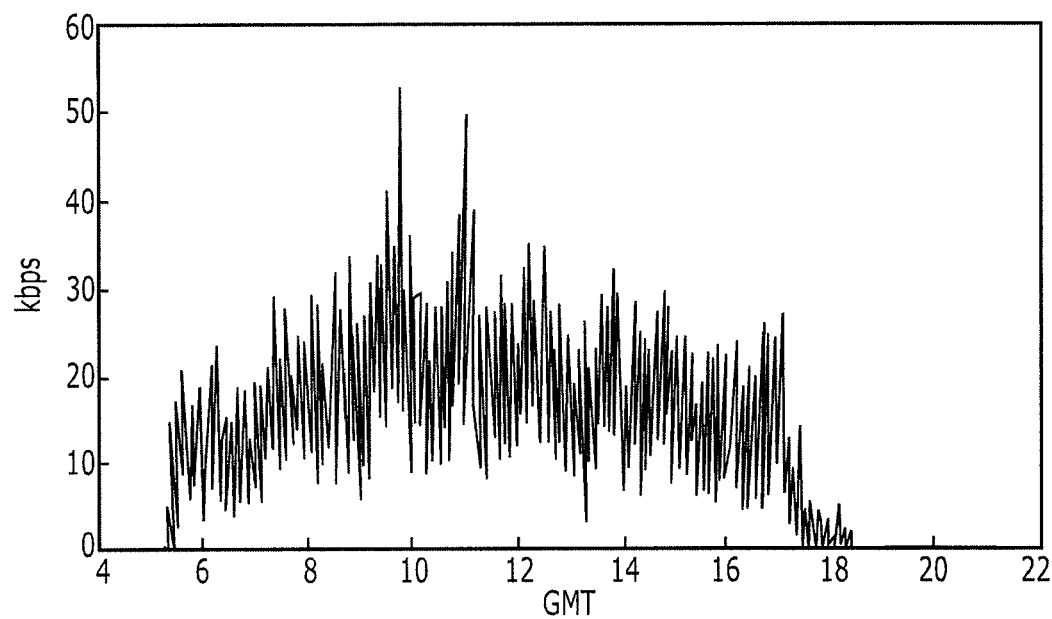

Neural networks, also known as artificial neural networks or neurocomputing, are biologically inspired intelligent computing simulation techniques based on biological neural networks that can be effectively used for classification and prediction. Unlike traditional computing techniques which simply process information, artificial neural networks learn and adapt in a manner similar to the human brain. As shown in FIG. 12, artificial neural network models 30 are composed of nodes 34 and 38, also known as neurons, for information processing, and connections 32 for passing signals. The connections may be weighted in order to appropriately increase or decrease the signals propagating therealong.

As known to those skilled in the art, one instance or method of learning for mutli-layer perception artificial neural networks is through back-propagation of training sets. In this regard, training data is passed through the artificial neural networks. The output of the artificial neural network is then compared to the anticipated output. In this regard, the anticipated outputs can be determined in advance since the training data which is propagated through the artificial neural network can also be similarly defined in advance. Based upon the differences or errors between the actual outputs of the artificial neural network and the anticipated outputs, the artificial neural network can be adapted, such as by adjusting weight of one or more connections or by changing the number of intermediate nodes 34 that are disposed between the inputs 36 and the outputs 38 of the artificial neural network, thereby altering the manner in which at least some of the inputs and outputs are interconnected. The training data may then be passed through the artificial neural network again and the outputs of the adapted artificial neural network compared to the anticipated outputs. The process of passing the training data through the artificial neural network, determining the errors between the outputs of the artificial neural network and the anticipated outputs and then adapting the artificial neural network in an effort to reduce the differences between the outputs of the artificial neural network and the anticipated output can be repeated any number of times, such as until the errors between the outputs of the artificial neural network and the anticipated outputs become sufficiently small, such as less than some predefined criteria.

Once the artificial neural network has been trained through the back-propagation of training data as described above, the architecture of the artificial neural network is established and the artificial neural network is then ready for use in classification or prediction.

Figure 16:
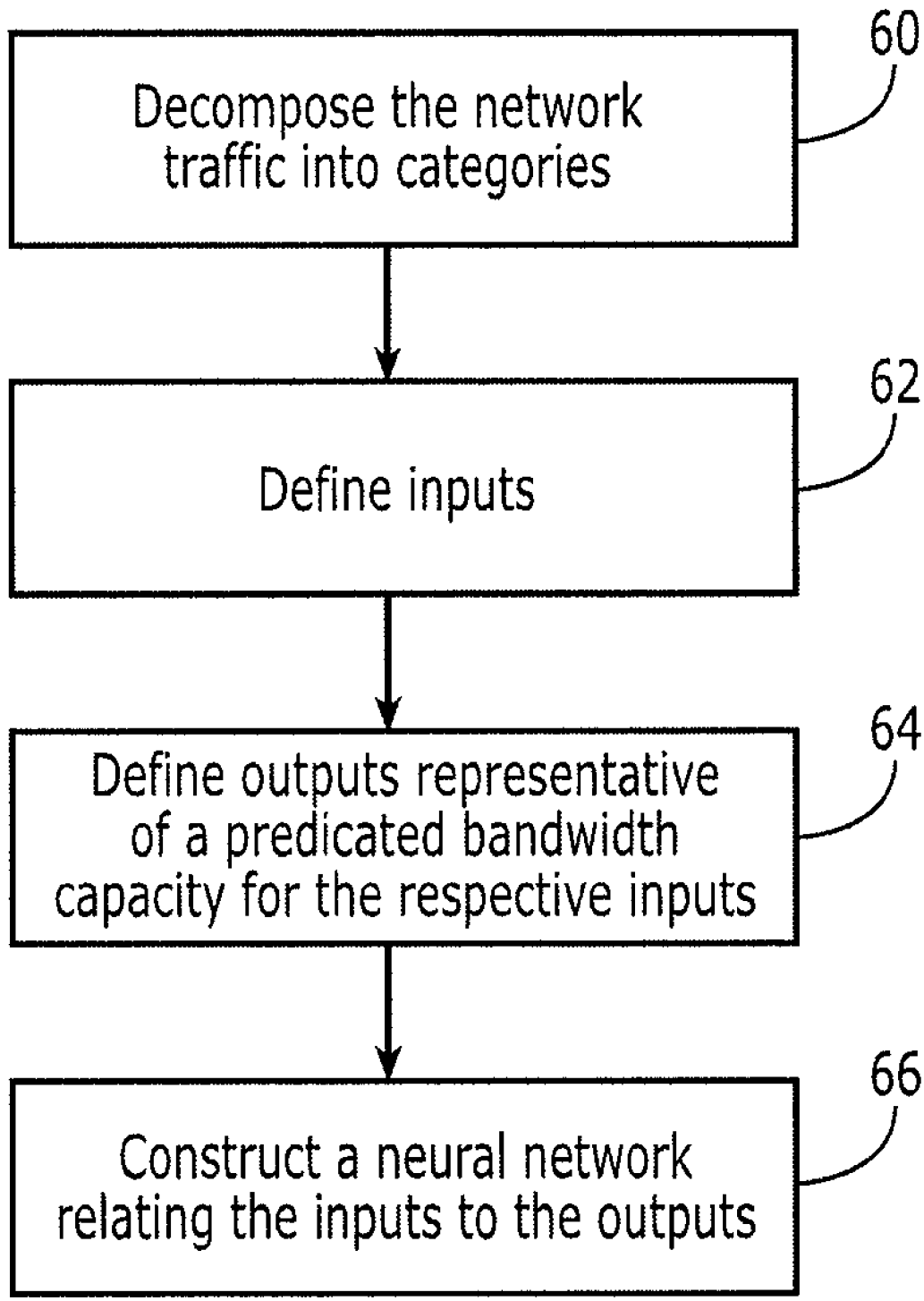
FIG. 16 is a flow chart of the operations performed to construct an artificial neural network in order to model network traffic in accordance with one embodiment to the present invention.

In order to develop an artificial neural network model for the prediction of network traffic, as shown in FIG. 16, such as to model the capacity of a network, the traffic data is advantageously decomposed into categories or groups. See block 60 of FIG. 16. Each category preferably has recognizably different characteristics in terms of its network traffic from the other categories. Within a category, however, the network usage is preferably relatively consistent, such as between users, from day-to-day and the like. The network traffic may be decomposed into various categories depending upon the network and the types of network traffic. For example, the network traffic may be decomposed into categories based upon the individual users with each individual user being separately categorized, categories based upon application usage or categories based upon common usage groups. Various types of common usage groups may be defined depending upon the network and the types of users of the network. Within each group, however, the users and, more particularly, the network usage of the users is generally relatively consistent and is different than the network usage of other common usage groups.

Figure 1:
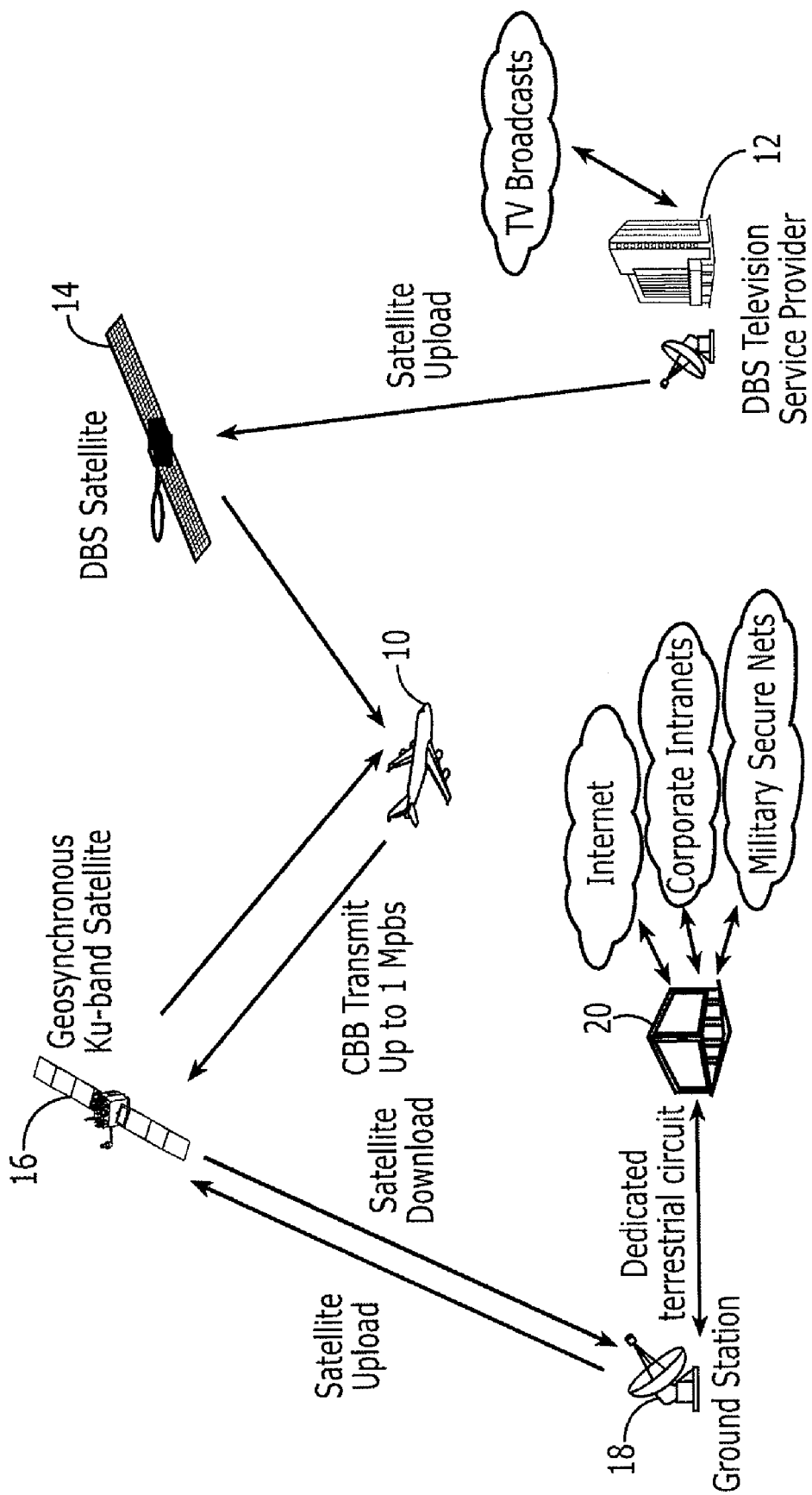
FIG. 1 is a schematic diagram of a network that provides for satellite communications with passengers onboard an aircraft.

In relation to the network depicted in FIG. 1 which provides bidirectional, high-speed broadband Internet data services for commercial airline passengers through shared broadband satellites 16 in geosynchronous orbit, common usage groups can be defined based upon airline flight routes. For example, one common usage group could be defined for those passengers onboard the flights from Tokyo, Japan to Berlin, Germany, while another group could include the user onboard the flights from Seattle, Wash. to Honolulu, Hi. By way of example, the bandwidth profiles representative of the network usage of the users onboard flights for six different flight routes are depicted in the FIGS. 13A-13F. The bandwidth profiles of FIGS. 13A-13F were developed by considering the network usage of all of the passengers onboard all of the flights traveling along a respective flight route during a three month period. The bandwidth profile for the users of each flight were then normalized to the same starting or departure time and the average of the bandwidth profiles of the respective flight were then determined in order to develop the bandwidth profiles for each respective flight route depicted in FIGS. 13A-13F. As shown, each bandwidth profile is distinct from the other bandwidth profiles, but each bandwidth profile is consistent from day-to-day, i.e., the bandwidth profile for flights along a particular flight route on one day is consistent with the bandwidth profile for the flights along the same flight route another day.

As noted above, the network traffic may be categorized in other manners. For example, the network traffic may be categorized based upon application usage since the use of different applications has recognizably different network usage characteristics as shown in FIGS. 2-7. Additionally, the network usage characteristics for a particular application may be consistent over different periods of time and at different locations. For example, a passenger utilizing an Internet chat application on a flight from Berlin would likely have similar network traffic characteristics to a passenger employing an Internet chat application onboard of a flight a different airline from Tokyo. As noted above, categories of network traffic may also be based upon individual users, although the diversity between individual users may make such a categorization more challenging with more variability from day-to-day and less repeatability than other categorization schemes, such as categorization based upon application usage or based upon common usage groups.

While a common usage group based upon flight routes has been described, other types of common usage groups can be developed depending upon the type of network and the users employing the network. For example, a common usage group of a military network may be based upon the platform which carries the users with different categories being provided for the users onboard each ship in a naval network and the users onboard each land vehicle for an army network. In a commercial environment, a network supported by a commercial retailer could define categories based upon the retail outlets with the users associated with each individual store comprising a respective common usage group.

Figure 15:
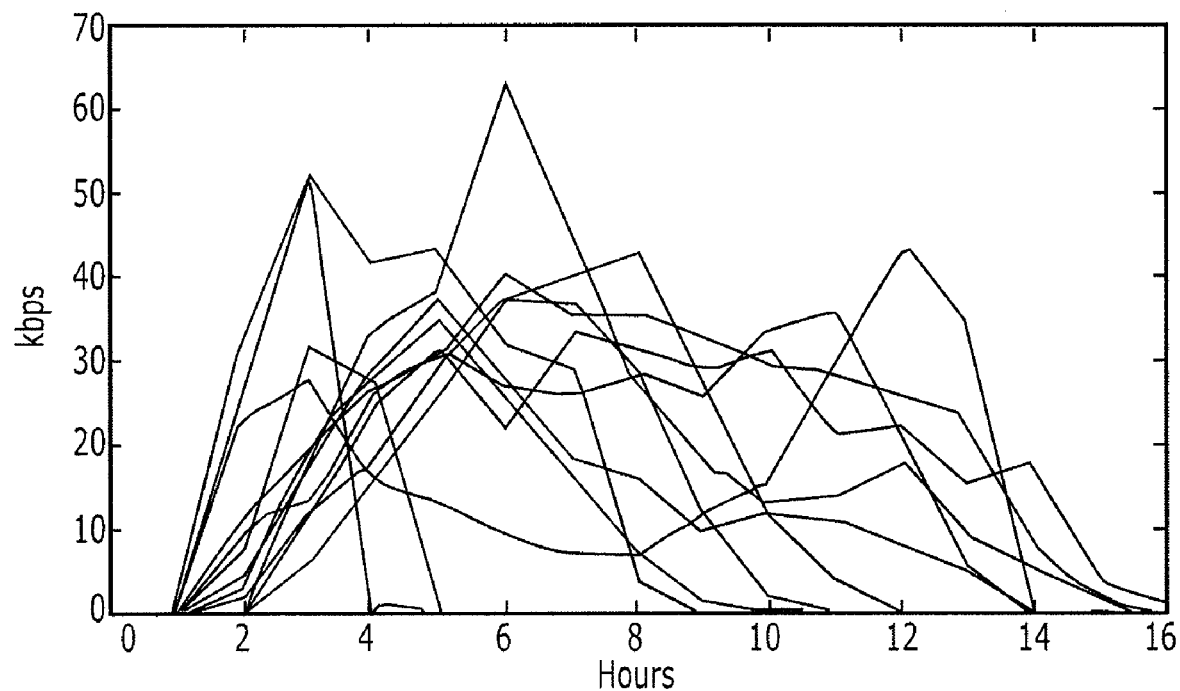
FIG. 15 is a graphical representation of ten outputs of an artificial neural network in accordance with one embodiment of the present invention in which each output represents a bandwidth profile for a respective flight route.

Once categories have been established for the network traffic, the artificial neural network architecture is developed by defining the inputs and the outputs. See blocks 62 and 64 of FIG. 16. The definition of the outputs will depend upon the information or data that is desirably produced by the artificial neural network. In instances in which the artificial neural network is designed to model the capacity of the network, bandwidth profiles or other information indicative of the network usage are generally provided as outputs from the artificial neural network. In the foregoing embodiment in which the network traffic is grouped in accordance with the bandwidth profile associated with each group, the outputs of the artificial neural network are generally the individual flight route bandwidth profiles, such as shown in FIG. 15.

Figure 14:
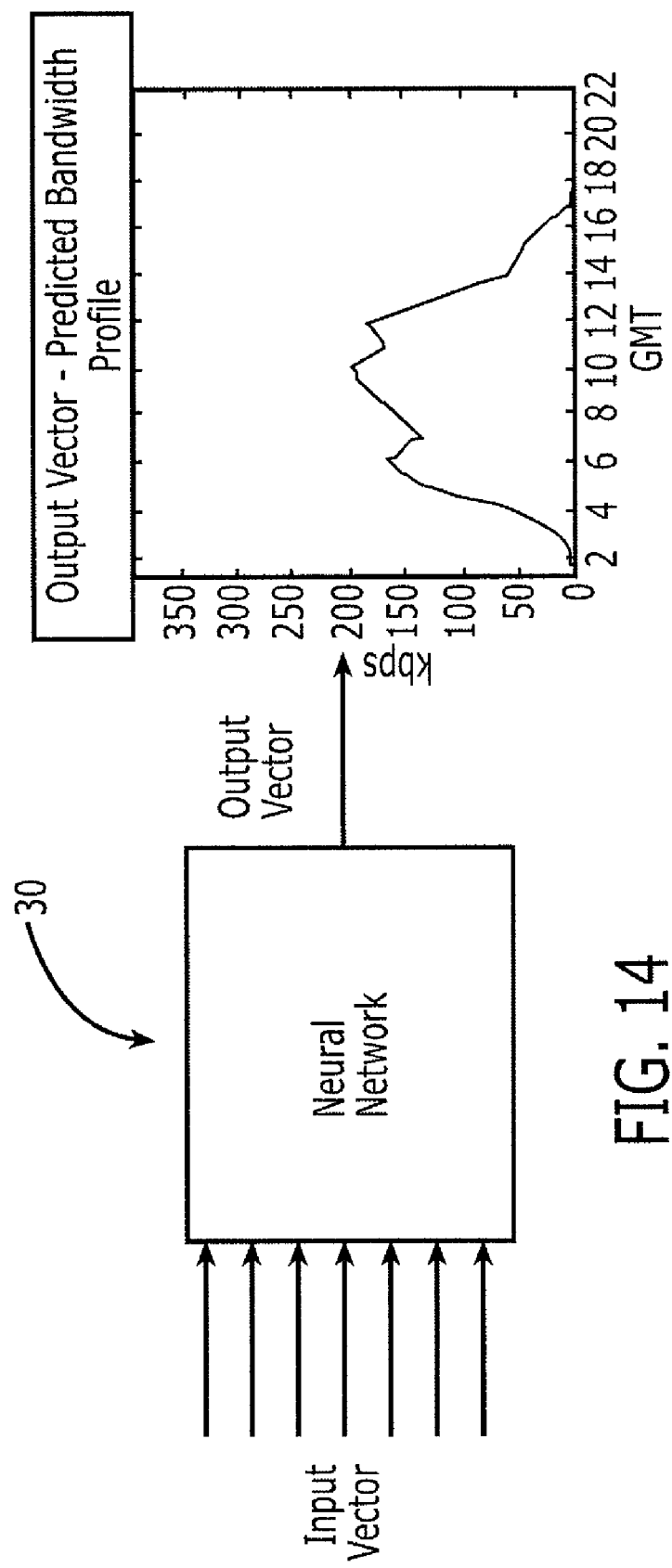
FIG. 14 is a block diagram of an artificial neural network constructed and/or employed in conjunction with embodiments of the present invention.

Once the category of outputs have been defined, the inputs are defined. In this regard, the inputs generally include one or more attributes that enable the artificial neural network to determine the proper output, such as the predicted bandwidth profile. In other words, the inputs are preferably defined such that a particular combination of inputs permits a determination of a set of outputs that represents a predicted bandwidth profile associated with that set of inputs. As shown in FIG. 14, the artificial neural network 30 may receive a plurality of inputs 36 which collectively constitute an input vector and produce plurality of outputs which collectively define an output vector, ten of which are shown by way of example in FIG. 15. In instances in which the outputs are predicted bandwidth profiles for respective flight routes that are identified by the inputs to the artificial neural network, the outputs, i.e., the predicted bandwidth profiles, may be aggregated in order to estimate the required network capacity, thereby providing a reliable measure for guiding the design and construction of the network.

The inputs 36 may be identified in various manners. In one embodiment, the input vector is a product of an Integrated DEFinition (IDEF) method study in combination with the analysis of various attribute statistics, pivot tables and rankings by gain. In this regard, IDEF is a structured approach to enterprise modeling and definition as described in more detail at www.idef.com. In the IDEF study of one embodiment, the input vector was defined utilizing the criteria of: (1) contribution to model accuracy, (2) reliability, (3) as few inputs as possible, and (4) easily obtainable. As noted above, in addition to the IDEF study, various attribute statistics may be examined, pivot table may be built and rankings by gain may be performed, such as described by J. Ross Quinlin, "C4.5: Programs for Machine Learning", Morgan Kaufmann Publishers, Inc., pages 5-8 (1992).

As a result of the IDEF study and the other analysis, the input vector of an artificial neural network designed to model the network capacity of a network as shown in FIG. 1 was defined to include 10 attributes so as to enable the artificial neural network to perform pattern recognition and to predict respective bandwidth profiles for corresponding flight routes. In this regard, the input attributes of this one embodiment include, for each flight; the number of users, the aircraft model, the airline, the length of flight, the departure time, the arrival time, the departure longitude, the departure latitude, the arrival longitude, and the arrival latitude. As noted above, a variety of different inputs and, in turn, a variety of different input vectors could be defined depending upon the type of network to be modeled, the desired complexity of the artificial neural network and the granularity of the outputs and the like.

In the foregoing example, the ten inputs permitted the bandwidth profile composed of seventeen points along the timeline of each flight to be predicted based upon different combinations of the inputs. In this regard, FIG. 15 illustrates the outputs for ten flight routes with each output depicting the bandwidth profile in terms of kilobits per second over the duration of the respective flight route. The predicted bandwidth profile is composed of seventeen points along a time history.

As described above, an artificial neural network is constructed and trained so as to receive the inputs and to produce the desired outputs. See block 66 of FIG. 16. As shown in FIG. 12, the artificial neural network generally includes an input layer having a plurality of input nodes. In the above example in which ten inputs define the input vector, the artificial neural network would correspondingly have ten input nodes with each node receiving a respective input. The artificial neural network also includes a plurality of output nodes. In the above example in which the bandwidth profiles for different flights routes were to be predicted, the artificial neural network would have seventeen output nodes with each output node representing a point on the time history of the predicted bandwidth profile of a respective flight based upon the input vector provided to the artificial neural network. Between the input and output nodes, the artificial neural network includes a plurality of intermediate nodes which may form one or more hidden layers. In the example depicted by FIG. 12, there are two hidden layers. The artificial neural network may include any number of intermediate nodes in any number of layers and, as described below, the number of intermediate nodes may be changed, i.e., either increased or decreased, during the process of training the artificial neural network. In the illustrated embodiment, however, both of the hidden layers include 39 intermediate nodes. The intermediate nodes implement a transfer function which defines the manner in which the data that is received by a respective node is either propagated or not by the intermediate node. While various transfer functions may be employed, the intermediate nodes of one embodiment, depicted by FIG. 12, include a hyperbolic tangent sigmoid transfer function for the first hidden layer and a logarithmic sigmoid transfer function for the second hidden layer. Similarly, the output nodes have respective transfer function which defines a manner in which the data that is received by an output node is propagated or not by the output node. In one embodiment, e.g., FIG. 12, each output node has a purely linear transfer function as known to those skilled in the art.

In order to appropriately train the artificial neural network, training data is collected, such as by monitoring the network traffic supported by the network. In conjunction with the network of the type shown in FIG. 1, the input values associated with the bandwidth profiles for each of the different flight routes may be collected over time. Thereafter, various combinations of inputs can be provided to the artificial neural network which then processes the inputs and produces the outputs. The outputs of the artificial neural network may then be compared to the anticipated outputs of the artificial neural network. In this regard, since the input, i.e., the training data, provided to the artificial neural network is predefined and known to be associated with the bandwidth profiles of one or more particular flight routes, the actual outputs of the artificial neural network can be compared with those outputs that are anticipated to be produced from the training data. The differences or errors between the outputs of the artificial neural network and the anticipated outputs of the artificial neural network may then be determined and back-propagated through the artificial neural network by adapting the artificial neural network in an effort to reduce the errors or differences therebetween. As known to those skilled in the art, an artificial neural network can be adapted in various manners, such as by changing the weight of one or more of the connections between the inputs, the intermediate nodes and the outputs and/or changing the number of intermediate nodes, such as by increasing or decreasing number of intermediate nodes, and therefore changing the manner in which the inputs and outputs are interconnected.

In an effort to reduce the error between the actual and anticipated outputs, the method of one embodiment employs back-propagation to initially examine the output nodes 38 and to determine what the output of each node should have been in order to have generated the anticipated output. A scaling factor is then determined with the scaling factor being representative of the manner in which the output of a respective node must be increased or decreased in order to match the anticipated output. In this embodiment, the scaling factor represents the local error for a respective node. The weights of a connection leading from the node are then adjusted to lower the local error. Blame for the local error is then assigned to nodes at the previous level, that is, the next level of nodes in a direction toward the inputs of the artificial neural network, e.g., the intermediate nodes of the embodiment of FIG. 12, with greater responsibility being given to nodes connected by larger weights. The foregoing process relating to the determination of a scaling factor for each node is then repeated at each level followed by the assignment of blame for a respective local error to corresponding nodes of a previous level. Once the errors have been back-propagated through the artificial neural network, the training data can be resubmitted to the adapted artificial neural network to determine if the actual output now either equals or at least more closely approaches the anticipated output.

In conjunction with or in addition to back-propagation, various training algorithms and learning functions may be employed to adapt the artificial neural network as known to those skilled in the art. By way of example, a training algorithm designated as the Levenberg-Marquardt may be employed to guide the adaptation of the weights of the connections. In this regard, the Levenberg-Marquardt training algorithm adjusts the weights of the respective connections in the direction of the negative gradient to minimize error. Additionally or alternatively, a gradient decent bias and learning function may be employed which also adjusts the weights of the connections in the direction of the negative gradient to minimize error.

Typically, once the artificial neural network has been adapted based upon the difference between the outputs of the artificial neural network and the anticipated outputs of the artificial neural network, the training data is again provided to the artificial neural network. The outputs of the adapted artificial neural network are then again compared to the anticipated output. If the differences between the outputs of the artificial neural network and the anticipated outputs of the artificial neural network are small enough, such as by being less than some predefined threshold, the artificial neural network may be considered to be appropriated trained and may then be released to service in order to process actual data. However, if the difference between the output of the artificial neural network and the anticipated outputs remains too large, such as by being greater than a predefined threshold, the process of further adapting the artificial neural network and then again providing the inputs to the artificial neural network can be repeated as many times as necessary in order to appropriately train the artificial neural network and to produce successful outputs.

Figure 17:
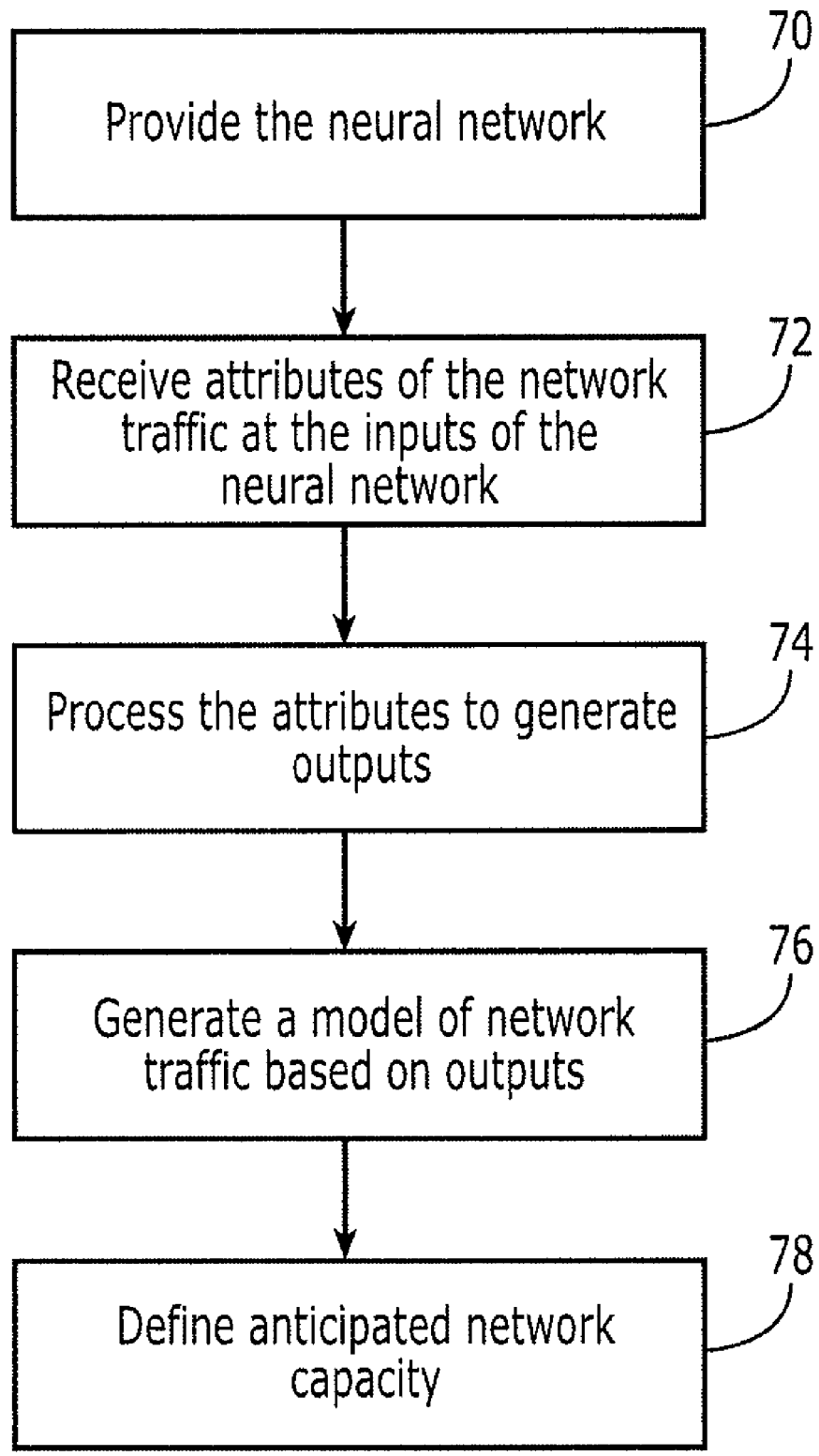
FIG. 17 is a flow chart of the operations performed to model network traffic in accordance with another embodiment to the present invention.

Once the artificial neural network has been constructed as described above in conjunction with FIG. 16 and as represented by block 70 of FIG. 17, a plurality of attributes representative of the network traffic may be provided to the inputs of the artificial neural network. See block 72. The artificial neural network can then process the plurality of attributes to generate a plurality of outputs. See block 74. As described above, the plurality of outputs effectively generate a model of network traffic, such as by providing predicted bandwidth profiles for various common usage groups, such as flight routes. See block 76. As also noted above, by summing the plurality of outputs, such as the predicted bandwidth profile associated with each category identified from the input vector to the artificial neural network, an anticipated network capacity can be defined, such that the network can be appropriately sized in order to support the anticipated capacity with the desired quality of service. See block 78.

Figure 18:
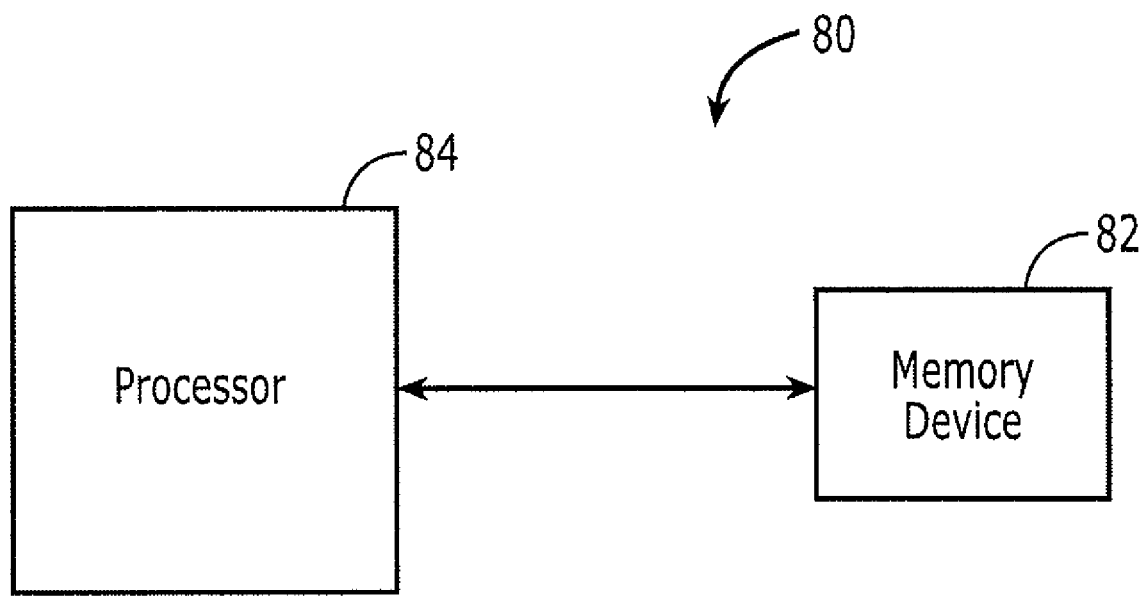
FIG. 18 is a block diagram of a system for modeling network traffic in accordance with one embodiment to the present invention.

A system 80 for modeling network traffic, such as shown in FIG. 18, typically includes a memory device 82 configured to store a representation of the artificial neural network. In this regard, the memory device typically stores information defining the number of inputs, the number of intermediate nodes as well as the respective transfer function for the intermediate nodes, the number of output nodes as well as the respective transfer function for the output nodes, the connections between the input, intermediate and output node and the weights associated with each connection. The system of FIG. 18 also includes a processor 84 for communicating with the memory device in order to model the network traffic. The processor can be embodied in any of a variety of computing devices including personal computers, workstations, servers, application specific integrated circuits (ASICs) or the like. The processor is generally configured to perform the operations described above in conjunction with the modeling of the network traffic, such as exemplified by FIGS. 16 and 17. In one embodiment, the memory device not only stores a representation of the artificial neural network, but also store computer program instruction that may be executed by the processor in order to perform the functions described above and shown by way of example, in FIGS. 16 and 17 in order to model the network traffic. As such, embodiments of the present invention can therefore also be embodied as a computer program product, which includes a computer-readable medium, such as the memory device, and a plurality of computer program instructions stored by the computer-readable medium for implementing the foregoing methods, such as those shown in FIGS. 16 and 17, upon execution, such as by the processor.

By employing an artificial neural network, the method and system of embodiments of the present invention permit the network traffic to be intelligently and adaptively modeled. As such, the system and method of embodiments of the present invention can provide meaningful estimations of the anticipated capacity of the network such that the network may be designed to provide the desired capacity while maintaining the requisite quality of service.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method for modeling network traffic comprising:
   decomposing the network traffic into a plurality of categories for training an artificial neural network with the network traffic within a category being different than the network traffic of other categories;
   defining a plurality of inputs which permit prediction of network traffic to be determined from a respective combination of inputs; and
   constructing the artificial neural network based on the categories of network traffic such that the artificial neural network is configured to evaluate the plurality of inputs and develop a plurality of outputs that represent a prediction of bandwidth profile for the related inputs, wherein each output represents the prediction of the bandwidth profile for a respective category, and wherein the plurality of outputs generated by the artificial neural network to provide a model of the network traffic, and wherein the plurality of outputs generated by the artificial neural network are aggregated to estimate a required network capacity.

2. A method according to claim 1 wherein decomposing the network traffic comprises decomposing the network traffic into a plurality of categories selected from the group consisting of individual users, application usage and common usage groups.

3. A method according to claim 1 wherein constructing the artificial neural network comprises training the artificial neural network with a plurality of predefined inputs and predefined outputs, wherein training the artificial neural network comprises:
   comparing the plurality of outputs from the artificial neural network with a plurality of anticipated predefined outputs based upon the plurality of predefined inputs; and
   adapting the artificial neural network to compensate for differences between the plurality of outputs and the plurality of anticipated predefined outputs.

4. A method according to claim 3 wherein the artificial neural network comprises a plurality of intermediate nodes having associated transfer functions and a plurality of connections having associated weights interconnecting the inputs, outputs and intermediate nodes, and wherein adapting the artificial neural network comprises altering the weights associated with respective connections.

5. A method according to claim 4 wherein adapting the artificial neural network comprises changing the number of intermediate nodes disposed between the inputs and the outputs.

6. A method according to claim 1 wherein decomposing the network traffic comprises decomposing the network traffic into a plurality of common usage groups.

7. A method according to claim 6 wherein each common usage group comprises passengers upon flights for a respective flight route.

8. A method for modeling network traffic comprising:
   providing an artificial neural network to evaluate a plurality of inputs and produce a plurality of outputs, wherein each output is representative of a predicted bandwidth profile related to the respective inputs;
   receiving a plurality of attributes representative of the network traffic at the inputs of the artificial neural network, wherein receiving the plurality of attributes comprises receiving attributes representative of the network traffic following decomposition into a plurality of categories with the network traffic within a category being different than the network traffic of other categories;
   processing the plurality of attributes with the artificial neural network in order to generate the plurality of outputs, wherein each output represents the prediction of the bandwidth profile for a respective category; generating a model of the network traffic based upon the plurality of outputs; and
   aggregating the plurality of outputs generated by the artificial neural network to estimate a required network capacity.

9. A method according to claim 8 further comprising decomposing the network traffic into a plurality of categories selected from the group consisting of individual users, application usage and common usage groups.

10. A method according to claim 8 wherein providing the artificial neural network comprises training the artificial neural network with a plurality of predefined inputs and predefined outputs, wherein training the artificial neural network comprises:
    comparing the plurality of outputs from the artificial neural network with a plurality of anticipated predefined outputs based upon the plurality of predefined inputs; and
    adapting the artificial neural network to compensate for differences between the plurality of outputs and the plurality of anticipated predefined outputs.

11. A method according to claim 10 wherein the artificial neural network comprises a plurality of intermediate nodes having associated transfer functions and a plurality of connections having associated weights interconnecting the inputs, outputs and intermediate nodes, and wherein adapting the artificial neural network comprises altering the weights associated with respective connections.

12. A method according to claim 11 wherein adapting the artificial neural network comprises changing the number of intermediate nodes disposed between the inputs and the outputs and the number of layers in which they are arranged.

13. A system for modeling network traffic comprising:
    a memory device configured to store a representation of an artificial neural network which relates a plurality of inputs to a plurality of outputs, wherein each output is representative of a predicted capacity bandwidth profile; and a processor configured to receive a plurality of attributes representative of the network traffic as inputs to the artificial neural network with the plurality of attributes comprising attributes representative of the network traffic following decomposition into a plurality of categories with the network traffic within a category being different than the network traffic of other categories, the processor also configured to process the plurality of attributes with the artificial neural network in order to generate the plurality of outputs with each output representing the prediction of the bandwidth profile for a respective category, the processor further configured to generate a model of the network traffic based upon the plurality of outputs, and the processor further configured to aggregate the plurality of outputs generated by the artificial neural network to estimate a required network capacity.

14. A method according to claim 8 wherein receiving the plurality of attributes comprises receiving the plurality of attributes following decomposition into a plurality of common usage groups.

15. A method according to claim 14 wherein each common usage group is comprised of passengers upon flights for a respective flight route.

16. A system according to claim 13 wherein each output is representative of a prediction which was derived from a respective category selected from the group consisting of individual users, application usage and common usage groups.

17. A system according to claim 13 wherein the plurality of outputs comprise bandwidth profiles associated with respective categories.

18. A system according to claim 13 wherein the processor is further configured to train the artificial neural network with a plurality of predefined inputs and predefined outputs, wherein the processor is configured to train the artificial neural network by:
comparing the plurality of outputs from the artificial neural network with a plurality of anticipated predefined outputs based upon the plurality of predefined inputs; and
adapting the artificial neural network to compensate for differences between the plurality of outputs and the plurality of anticipated predefined outputs.

19. A system according to claim 18 wherein the artificial neural network comprises a plurality of intermediate nodes having associated transfer functions and a plurality of connections having associated weights interconnecting the inputs, outputs and intermediate nodes, and wherein the processor is configured to adapt the artificial neural network by altering the weights associated with respective connections.

20. A system according to claim 16 wherein the processor is further configured to adapt the artificial neural network by changing the number of intermediate nodes disposed between the inputs and the outputs.

21. A system according to claim 13 wherein the processor is configured to receive the plurality of attributes following decomposition of the network traffic into a plurality of common usage groups.

22. A system according to claim 21 wherein each common usage group is comprised of passengers upon flights for a respective flight route.

* * * * *